Oct. 28, 1924.

T. PRESCOTT 1,513,420

AUTOMATIC TRAP NEST REGISTER

Filed Oct. 22, 1923   2 Sheets-Sheet 1

INVENTOR.
Thomas Prescott
BY
ATTORNEY

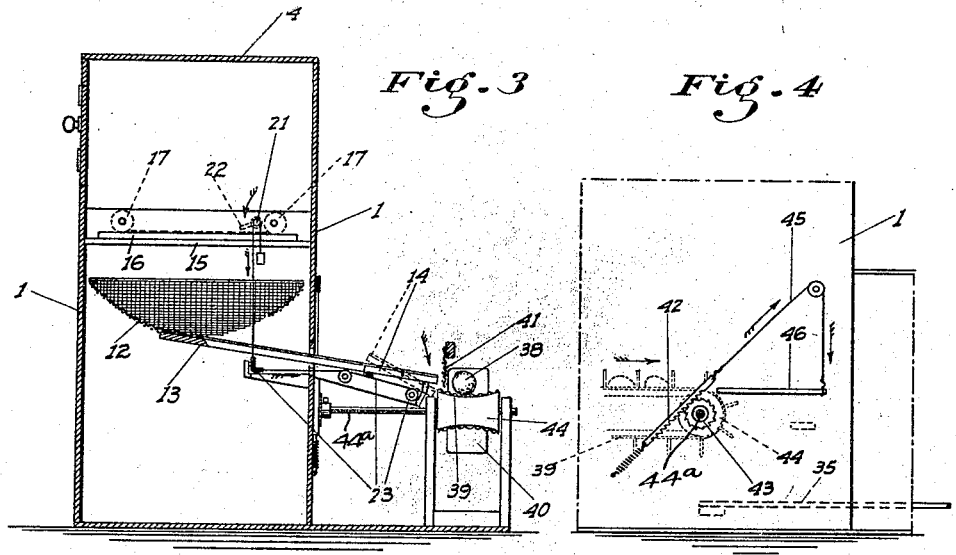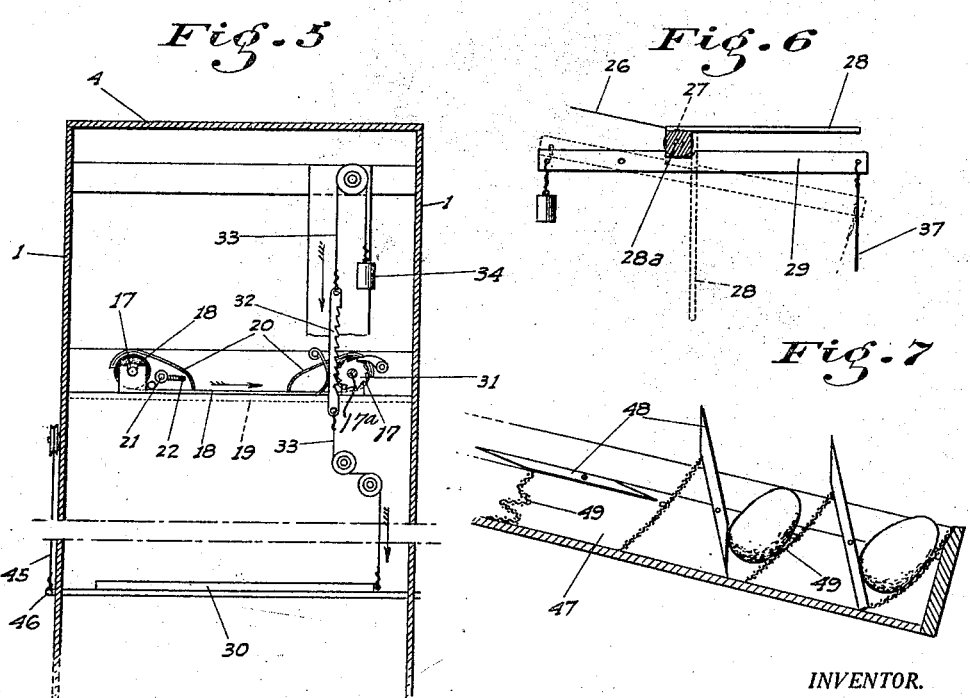

Patented Oct. 28, 1924.

1,513,420

UNITED STATES PATENT OFFICE.

THOMAS PRESCOTT, OF STOCKTON, CALIFORNIA.

AUTOMATIC TRAP-NEST REGISTER.

Application filed October 22, 1923. Serial No. 670,007.

*To all whom it may concern:*

Be it known that I, THOMAS PRESCOTT, a citizen of the United States, residing at Stockton, county of San Joaquin, State of California, have invented certain new and useful Improvements in Automatic Trap-Nest Registers; and I do declare the following to be a full, clear, and exact description of the same, reference being had to the accompanying drawings, and to the characters of reference marked thereon, which form a part of this application.

This invention is a device for use in poultry yards, and especially in those yards where the poultry raising and egg production is a commercial proposition.

The principal object of the invention is to provide a device which will register any hens having a propensity to lay, and will also register whether or not any hen has actually laid an egg, thus of course enabling the poultryman, after a predetermined period of operation, to positively ascertain which of his flock are prolific and which the poor or nonlayers, and he may of course then act accordingly and make the necessary segregation of the hens.

I have also provided a means for enabling the eggs laid by the hens to be subsequently identified as being the product of different individual hens, even though a common laying nest is used by all the hens.

The above objects in general are accomplished by providing an enclosed nest, and having registering devices in connection therewith, and actuated both by the hen and by an egg if any is laid, the registering device actuated by the hen being so arranged that she must leave an identifying mark before leaving the nest enclosure. Also the egg, which automatically rolls from the nest, automatically registers itself during its passage from the nest, in connection with the registering mark left by the hen.

Means is also provided, likewise actuated by each hen after she has been registered, for insuring that the registration of a subsequent hen and egg will be separated from the former, so that there will be no doubt or conflict as to which is which.

The above and other objects I accomplish by means of such structure and relative arrangement of parts as will fully appear by a perusal of the following specification and claims.

In the drawings similar characters of reference indicate corresponding parts in the several views:

Fig. 3 is a cross section on the line 3—3 of Fig. 2.

Fig. 4 is a fragmentary side view of the device, showing a hen-actuated means for advancing the egg conveyor.

Fig. 5 is a cross section on the line 5—5 of Fig. 2, looking toward the entrance end.

Fig. 6 is a detail view of a door control or holding member.

Fig. 7 is a fragmentary view of a modified form of egg receiving structure.

Figure 1:
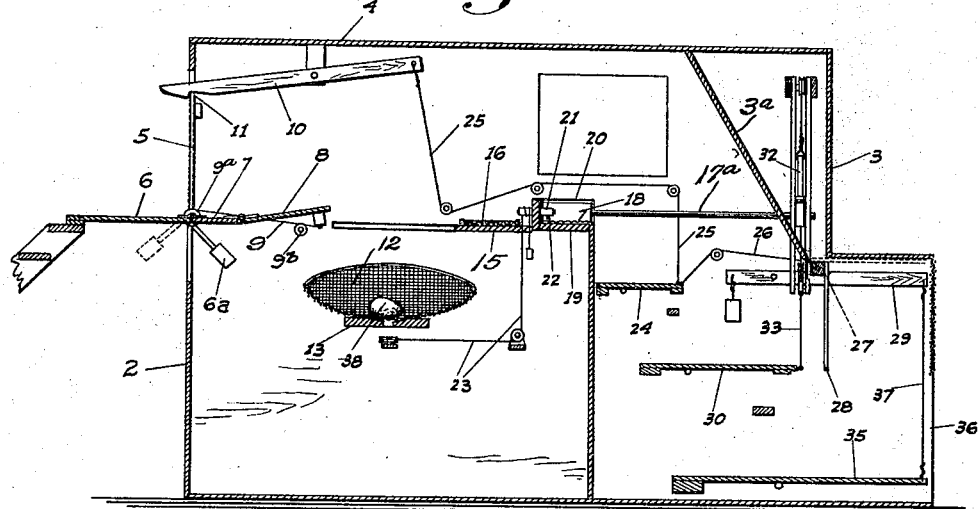
Fig. 1 is a longitudinal section of the registering device.
Figure 2:
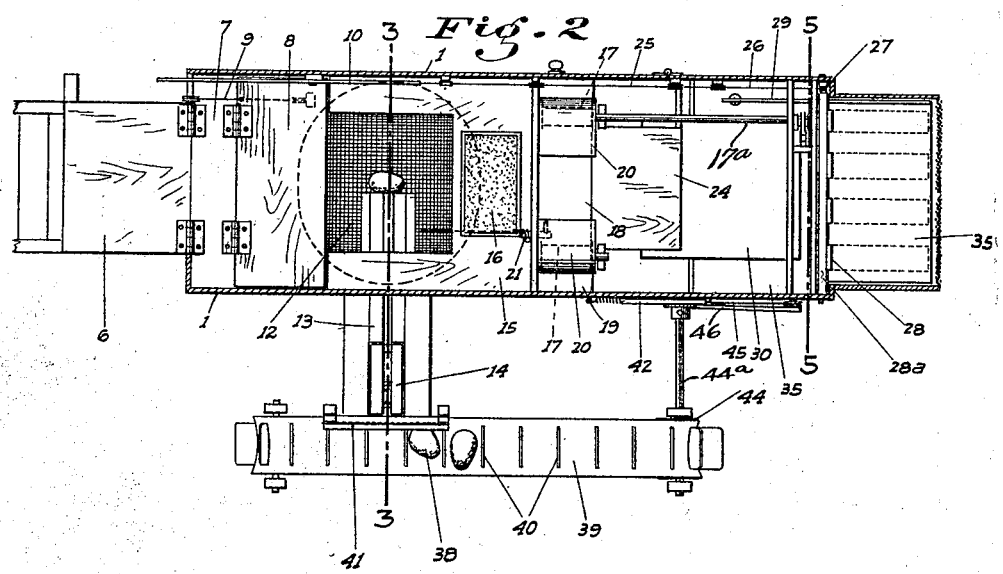
Fig. 2 is a top plan view of the same with the cover removed.

Referring now more particularly to the characters of reference marked on the drawings, I provide an enclosure of suitable size which includes side walls 1, front and rear end walls 2 and 3, and a cover or ceiling 4.

In the forward wall 2 is an opening 5, of suitable size to serve as an entrance-way for a hen, pivoted along the bottom of which opening and adapted to close the same is a door 6, opening outwardly to a horizontal position, then forming an apron.

Mounted in the enclosure in horizontal alinement with the door 6 when open is a fixed platform 7, at the rear end of which is pivoted another platform 8, arranged for limited vertical movement. This platform is held in its uppermost position when the door 6 is open, and is connected to said door by means of a pulley cord 9 attached to the rear end of the platform 8 and wound on a pulley 9$^a$ attached to the pivot of the door 6. An idler pulley 9$^b$ is mounted in a fixed position just ahead of the connection of the cord with the platform 8 and on which said cord rests when in a normal taut position, the cord being then in a straight line. Therefore when the platform 8 is depressed by the weight of a hen thereon, the rear end of the cord only is depressed. The distance from the cord connection to the pulley 9$^b$, and thence to the pulley 9$^a$, being greater of course than the original straight line therebetween, the cord tends to unwind from the pulley 9$^a$ and in doing so rotates the same. The said pulley being fixed on the door pivot, the door is raised to a closed position with such rotation.

A lever 10 is pivoted intermediate its ends above the plane of the door, and has a notch 11 at its forward end adapted to engage the forward edge of the door, or a projection thereon, when said door is raised, the lever being so constructed that it tends to drop at its front end.

Just beyond the platform 8 and preferably at a somewhat lower level than the same, is a fixed nest 12 of suitable formation, from the bottom of which a downwardly inclined and centrally grooved chute 13 leads transversely of the enclosure to the outside of the same.

Pivoted in this chute for longitudinal tilting movement adjacent the outer end of the same is a platform 14, on which an egg from the chute rolls, and which is depressed at its outer end by the weight of said egg, for the purpose hereinafter set forth.

Beyond the nest, and preferably about on the same level as the platform 8 is a fixed shelf or step 15 having an ink-pad 16 thereon which covers the greater portion of its area.

Beyond the pad and mounted transversely of the enclosure and on each side of the plane of the pad are spools 17 having paper 18 wound thereon, which passes under and between said spools, resting on a fixed shelf 19 thereunder.

The spools and paper thereon are preferably covered by hoods 20, with sufficient room therebetween for a hen to stand on the paper.

Turnably mounted under one of the hoods is a spindle 21 having a soft crayon or flexible marker 22 of suitable character projecting radially therefrom.

The spindle is connected to the pivoted egg-chute member 14 by a suitable pulley and cord arrangement 23 extending therebetween, the depression of said chute member with the weight of an egg causing the spindle to be rotated sufficiently to bring the marker 22 onto the paper thereunder, making a mark thereon and thus registering the egg on the paper.

Mounted in the enclosure beyond the paper and preferably below the same is a platform 24, arranged to be depressed at its rear end by the weight of a hen thereon.

A pulley and cord structure 25 extends from the rear end of this platform to the catch-lever 10, being arranged in connection with the latter so that with a depression of the platform 24, said lever will be raised clear of the door 6, allowing the latter to resume its normal horizontal position, either by virtue of its own weight or by the aid of additional weight means 6$^a$.

Likewise connected to the rear end of said platform 24 is another pulley and cord arrangement 26 extending to and wrapped around a small drum 27 concentric with the pivotal connection of a door 28, positioned a certain distance beyond the platform 24. This door normally hangs vertically down from its pivoted end, but is raised to an outward horizontal position with the rotation of the drum 27 caused by the pull on the cord 26 with the depression of the platform 24.

Suitable means are provided for maintaining the door 28 in its open position when once raised.

This means comprises a pivoted bar 29 under the pivotal shaft 28$^a$ of the door, which at least adjacent the bar, is square in cross section, as shown.

The forward end of the bar, ahead of its pivot, which in turn is ahead of the doorshaft, is weighted as shown in Fig. 6, so that the rear portion of said bar constantly bears against one of the flat faces of the square shaft, preventing it from ready turning. At the same time, when the cord 26 is pulled, the resistance to the turning of said shaft normally offered by the weighted bar is overcome, the bar being depressed and the weight lifted as the square corner of the shaft, in turning through a 90° arc, bears down against said bar.

The door 6 and the adjacent enclosure-walls are opaque, but the door 28, and the enclosure-walls therebeyond, are translucent, the door being preferably formed of spaced slats, and the rear enclosure wall in alinement therewith either slats or screening.

Below and beyond the platform 24 and extending therefrom to the vertical plane of the door 28 is a platform 30, depressible at its rear end by the weight of a hen thereon. To the rear end of this platform is connected a means for advancing the paper 18 when the said platform is depressed, or in other words causing said paper to be unwound from one of the spools 17 onto the other.

The means I have here shown comprises a ratchet wheel 31 mounted in connection with the shaft 17$^a$ of the take-up one of the spools 17. This wheel is rotated in one direction only by means of a ratchet-rack 32, flexibly suspended between two lengths of cord 33, one of which is attached to the rear end of the platform 30 and the other to a weight 34. The rack and ratchet wheel are arranged so that the latter is rotated sufficient to advance or wind the paper several inches, with the depression of the platform, the weight 34 keeping the cords 33 taut when the hen leaves the platform, the rack then passing by the ratchet wheel without imparting any movement thereto.

Sloping inwardly and upwardly from the top of the door 28 is an auxiliary rigid end wall 3ª, arranged so as to restrict the area of the passage through which the hen must pass, and prevent her from possibly flying or jumping from the shelf 19 onto the platform 30, without resting on the intermediate platform 24.

Below and beyond the platform 30 and door 28 is a final depressible platform 35, just inside the exit opening 36 at the extreme rear end of the enclosure. A cord 37 extends from the depressible end of the platform to the rear end of the bar or lever 29 so that when the plaform is depressed by the weight of a hen thereon, the bar will be depressed, causing the same to clear the door-shaft 28ª, and allowing the door freedom of swinging movement.

It will be noted that I have not described in detail the exact arrangement of the different cord and pulley structures, since it will be evident that various different arrangements may be used by which the desired results may be obtained.

Briefly, the continuous sequence of operations is as follows:

To start, the door or apron 6 is open and the door 28 closed.

The hen first stands on the apron, reaching that level by suitable steps or a runway (not shown) leading thereto from outside the enclosure.

Advancing into the enclosure, the hen must step on the platform 8, causing the closing of the door 6, and temporarily preventing the entrance of another hen, the door being held closed by the catch lever 10. The hen in the enclosure then passes onto the nest, where the egg 38 will be laid. As soon as the hen rises off the egg, the latter will roll down the inclined chute 13 and finally over the auxiliary movable chute 14, the depression of which by the weight of the egg causing the marker 22 to descend against the paper 18 and make a mark thereon.

The hen on leaving the nest will next step on the pad 16, since she will naturally travel toward the rear end of the enclosure, because daylight is visible at that end. From the pad she will step onto the paper 18, leaving an impression thereon. This impression may be made typical of any individual hen by having the feet of the different hens marked or treated in any suitable way so that different impressions are left on the paper, which can be readily identified by the poultryman.

Stepping off the paper onto the platform 24, the hen causes the depression of said platform, which releases the lever 10 and allows the door 6 to again open. At the same time the depression of said platform causes the door or gate 28 to open up, the weight of the hen, imparted as a pull to the cord 26 which in turn rotates drum 27, being sufficient to overcome the resistance to turning of the shaft 28ª offered by the notched bar 29. Leaving platform 24, the hen will step onto the platform 30, and the gate 28 being open, she may then step down onto the platform 35 and out. She cannot fly directly from the platform 30 out into the open without stepping on the platform 35, since the exit opening 36 is in a lower plane than said platform 30. The weight of the hen on the platform 30 causes the advancement of the paper strip 18, concealing the impressions just made thereon and leaving a clean surface for the impression and registering of the next hen and egg.

When on the platform 35, the weight of the hen causes the tripping of the bar 29, allowing the gate 28 to close, so that no hen can enter the enclosure from that end.

It will therefore be seen that the poultryman can readily tell, by an inspection of the paper roll after a desired period of operation, which of his flock of hens have passed through the trap register during that period, and which of those passing through have actually laid eggs, since the egg-registering mark on the paper is close to the foot mark of the hen which laid the egg.

In connection with this registering apparatus, I have provided a means for segregating the eggs in such a manner that it will be known which egg is from one particular hen and which is from another.

This means comprises a horizontal belt or other conveyor 39 mounted longitudinally of the enclosure on the ouside of the same. Vertical transverse cleats or partitions 40 divide the belt into a number of compartments, each big enough to contain an egg.

The chute 14 extends transversely of the belt and discharges thereonto, a flexible vertical curtain 41 being preferably hung between said chute and the conveyor to break the speed of the egg after rolling down the chute while still permitting it to pass onto the conveyor between any two of the partitions thereon.

The conveyor is advanced a distance equal to the space between any two of the partitions by means of a rack 42 engaging a ratchet wheel 43 mounted in common with the drive roller 44 of the conveyor, said roller and ratchet wheel having a common shaft 44ª.

This rack is reciprocated by means of a cord 45 attached thereto and to the outer end of an arm 46 mounted in fixed relation with the platform 30 and movable therewith.

The movement of the registering paper is coordinated with that of the conveyor.

Therefore if the relative positions of the conveyor and paper to each other, and of the conveyor to the chute are known at the outset of operations, then the fifth egg on the conveyor for instance will be that laid by the hen which left the fifth foot impression on the paper. If any hen fails to lay an egg, a vacancy will be left on the conveyor, since the latter advances irrespective of the egg-laying.

In Fig. 7, I have shown a modified form of egg separating means.

This comprises an inclined structure 47 adapted to extend as a continuation of the chute 13. A floor is mounted in this structure intermediate the top and bottom of the same comprising a plurality of transversely pivoted horizontal plates 48, overlapping and so arranged relative to each other as to be caused to tip downwardly at their outer ends. These plates overlap each other in such a manner that the outermost one will tip down, with the weight of an egg, before the next one behind can do so, and so on. The plates, when thus tipped down, at their outer or forward ends, project above the structure 47 at their other ends, and have attached to their under sides adjacent said other ends, transversely disposed and flexible curtains or baffles 49, the lower ends of which are secured to the fixed portion of the structure. By means of this construction and arrangement of parts, it will be seen that an egg rolling over the floor-plates, will cause the outermost one to tip downwardly, thus pocketing the egg between said plate and the outer end of the structure, the egg preventing the return of the plate to its normal horizontal position. This tipping of the plate causes the curtain thereon to be more or less straightened out, as shown, so that the nest egg, when it reaches and tips the adjacent plate, will be caught by the yieldable curtain ahead instead of striking the hard plate and possibly breaking the egg.

Figure 8:
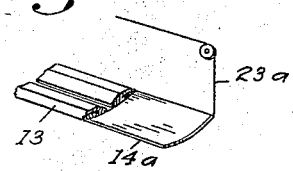
Fig. 8 is a fragmentary view of a modified form of egg-depressed platform or registering marker actuating means.

In Fig. 8, I have shown a longitudinal concaved depressible apron 14ª leading from the chute 13 and hinged at the outer end thereof, instead of the inset member 14.

This apron is balanced so as to normally lie in its uppermost position, the balance being overcome by the weight of an egg on the apron.

A cord 23ª attached to the end of the apron extends to the marker-spindle 21 to actuate the same as before with the depression of said apron.

From the foregoing description it will be readily seen that I have produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A device as described including an enclosure having entrance and exit openings, a nest mounted in the enclosure intermediate said openings, doors for the latter, the entrance door being normally open and the exit door normally closed, a platform onto which the hen steps after passing through the entrance, means between said platform and door whereby the latter will be closed with the weight of a hen on the platform, a second platform in the enclosure beyond the nest and onto which the hen must step after leaving the nest, means between said second platform and each door whereby said doors will be both caused to open with the weight of a hen on said second platform, a further platform onto which the hen must step after passing by the exit door, and means between said last platform and the exit door whereby the latter will be caused to close with the weight of the hen on said last platform.

2. A device as described including an enclosure having entrance and exit openings, a nest mounted in the enclosure intermediate said openings, means for causing an egg laid in the nest to roll clear of the same after the hen has risen, and means actuated by the weight of the egg during its rolling movement for causing a printed registration of the same to be made.

3. A device as described including an enclosure having entrance and exit openings, a nest mounted in the enclosure intermediate said openings, means for causing an egg laid in the nest to roll clear of the same after the hen has risen, a strip of markable material, and means actuated by the weight of the egg during its rolling movement for causing a mark to be made on said strip.

4. A device as described including an enclosure having entrance and exit openings, a nest mounted in the enclosure intermediate said openings, means for causing an egg laid in the nest to roll clear of the same after the hen has risen, a strip of markable material, and means actuated by the weight of the egg during its rolling movement for causing a mark to be made on said strip, and means whereby the hen will leave an identifying mark on said strip near the egg mark thereon after the hen leaves the nest and prior to her emerging from the enclosure.

5. A device as described including an enclosure having entrance and exit openings, a nest mounted in the enclosure intermediate said openings, means for causing an egg laid in the nest to roll clear of the same after the hen has risen, a strip of markable material, means actuated by the weight of an egg during its rolling movement for causing a mark to be made on the strip, means whereby the hen after leaving the nest will also make a mark on the strip, and means actuated by the hen after moving beyond the strip for shifting the latter to present a fresh surface for subsequent registration marks.

6. A device as described including an enclosure having entrance and exit openings, a nest mounted in the enclosure intermediate said openings, means for causing an egg laid in the nest to roll clear of the same after the hen has risen, a pair of spaced spools mounted in the enclosure beyond the nest, a roll of paper wound on said spools and extending therebetween, means whereby the egg and the hen will both cause marks to be made on the paper, and means actuated by the hen after passing beyond the strip for turning one of the spools and winding the paper thereon, whereby a fresh surface of the paper is exposed between the spools for subsequent registration marks.

7. A device as described including an enclosure having entrance and exit openings, a nest mounted in the enclosure intermediate said openings, means for causing an egg laid in the nest to roll clear of the same after the hen has risen, a strip of markable material, and means actuated by the weight of the egg and by the hen laying the same for causing marks, adjacent each other, to be made on the strip.

8. A device as described including an enclosure having entrance and exit openings, a nest mounted in the enclosure intermediate said openings, means for causing an egg laid in the nest to roll clear of the same after the hen has risen, a pair of spaced spools mounted in the enclosure beyond the nest, a roll of paper wound on said spools and extending therebetween, means whereby the egg and the hen will both cause marks to be made on the paper, a platform on which the hen must step after passing beyond the paper, and means between said platform and one of the spools and actuated by the weight of the hen on the platform for causing the spool to be rotated sufficiently to insure a fresh surface of the paper being exposed between the spools for subsequent registration marks.

9. A device as described including a nest, a chute leading from the nest and onto which an egg automatically rolls after being laid in the nest, a strip of markable material, a movable marker mounted adjacent the strip, and means between the chute and the marker and actuated by the egg on said chute for then causing the marker to be moved to contact with the strip.

10. A device as described including a nest, an enclosed chute leading from the nest and onto which an egg automatically rolls after being laid in the nest, a horizontally movable conveyor structure extending transversely of the chute outside the nest enclosure, partitions on said conveyor dividing the same into a plurality of individual egg compartments, each compartment in turn being adapted to aline with the outer end of the chute whereby an egg rolling down the chute will be deposited in a compartment, and means actuated by each hen after leaving the nest for causing the conveyor to be moved a distance sufficient to aline the adjacent compartment thereon with the chute.

11. A trap nest including a nest, an endless horizontal conveyor structure subdivided into a number of longitudinal compartments, means whereby an egg laid in the nest will roll into a compartment, a roller about which the conveyor passes, a shaft for said roller, a depressible platform onto which the hen must step after leaving the nest, and pawl and ratchet means between said platform and the shaft for causing the shaft to be rotated and the conveyor advanced a predetermined amount when the platform is depressed.

In testimony whereof I affix my signature.

THOMAS PRESCOTT.